US009725176B2

(12) United States Patent
Ferguson et al.

(10) Patent No.: US 9,725,176 B2
(45) Date of Patent: Aug. 8, 2017

(54) DUAL-FUNCTION SEAT ACTUATOR

(71) Applicant: AMI INDUSTRIES, INC., Colorado Springs, CO (US)

(72) Inventors: Keith M. Ferguson, Colorado Springs, CO (US); Douglas E. Hoover, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 130 days.

(21) Appl. No.: 14/618,052

(22) Filed: Feb. 10, 2015

(65) Prior Publication Data
US 2016/0229539 A1    Aug. 11, 2016

(51) Int. Cl.
| B64D 11/06 | (2006.01) |
| B60N 2/08 | (2006.01) |
| B60N 2/02 | (2006.01) |
| F16H 21/02 | (2006.01) |
| F16H 37/14 | (2006.01) |

(52) U.S. Cl.
CPC ........ *B64D 11/0639* (2014.12); *B60N 2/0296* (2013.01); *B60N 2/0875* (2013.01); *B64D 11/064* (2014.12); *B64D 11/0696* (2013.01); *F16H 21/02* (2013.01); *F16H 37/14* (2013.01)

(58) Field of Classification Search
CPC ... B64D 11/064; B64D 11/0696; F16H 21/02; F16H 37/14; B60N 2/0296; B60N 2/0875
USPC ...................................... 297/344.1
See application file for complete search history.

(56) References Cited

U.S. PATENT DOCUMENTS

| 3,486,724 | A | * | 12/1969 | Adamski | ................ | B63H 20/06 |
| | | | | | | 248/284.1 |
| 3,530,740 | A | | 9/1970 | Turner | | |
| 3,622,202 | A | | 11/1971 | Brown | | |
| 5,002,172 | A | | 3/1991 | Stringer | | |
| 5,299,853 | A | | 4/1994 | Griswold et al. | | |
| 5,360,185 | A | | 11/1994 | Derrien | | |
| 5,543,812 | A | | 8/1996 | Blanche et al. | | |
| 5,758,544 | A | | 6/1998 | Lee | | |
| 6,231,123 | B1 | * | 5/2001 | Tame | ................... | B60N 2/0705 |
| | | | | | | 297/375 |
| 6,484,969 | B2 | | 11/2002 | Sprenger et al. | | |

(Continued)

FOREIGN PATENT DOCUMENTS

| EP | 2695813 | 2/2014 |
| FR | 2927608 | 8/2009 |
| JP | 2008265665 | 11/2008 |

OTHER PUBLICATIONS

Notice of Allowance dated Jan. 29, 2016 in U.S. Appl. No. 14/618,033.

(Continued)

*Primary Examiner* — Milton Nelson, Jr.
(74) *Attorney, Agent, or Firm* — Snell & Wilmer, L.L.P.

(57) ABSTRACT

Systems and methods are disclosed herein for an aircraft seat with a dual-function linear actuator. The linear actuator may activate a first adjustable feature by moving in a first direction, and the linear actuator may activate a second adjustable feature by moving in a second direction. The linear actuator may include a decoupling mechanism. The decoupling mechanism may decouple the first adjustable feature and the second adjustable feature from the linear actuator in response to loss of power to the linear actuator.

14 Claims, 15 Drawing Sheets

(56) References Cited

U.S. PATENT DOCUMENTS

| | | |
|---|---|---|
| 6,907,966 B2 | 6/2005 | Audren et al. |
| 7,100,870 B2 | 9/2006 | Flatt |
| 8,336,817 B2 | 12/2012 | Flatt |
| 9,290,272 B1 | 3/2016 | Hoover et al. |
| 2007/0145806 A1 | 6/2007 | Wilder et al. |
| 2008/0105784 A1 | 5/2008 | Barroca |
| 2008/0122279 A1 | 5/2008 | Park |
| 2009/0071273 A1 | 3/2009 | Velasco |
| 2010/0253129 A1 | 10/2010 | Dowty |
| 2011/0241401 A1 | 10/2011 | Otsuka |
| 2012/0306252 A1 | 12/2012 | Ligonniere et al. |
| 2015/0108817 A1 | 4/2015 | Meister et al. |

OTHER PUBLICATIONS

Extended European Search Report dated Jul. 6, 2016 in European Application No. 16155055.3.
Extended European Search Report dated Jul. 6, 2016 in European Application No. 16154898.7.

* cited by examiner

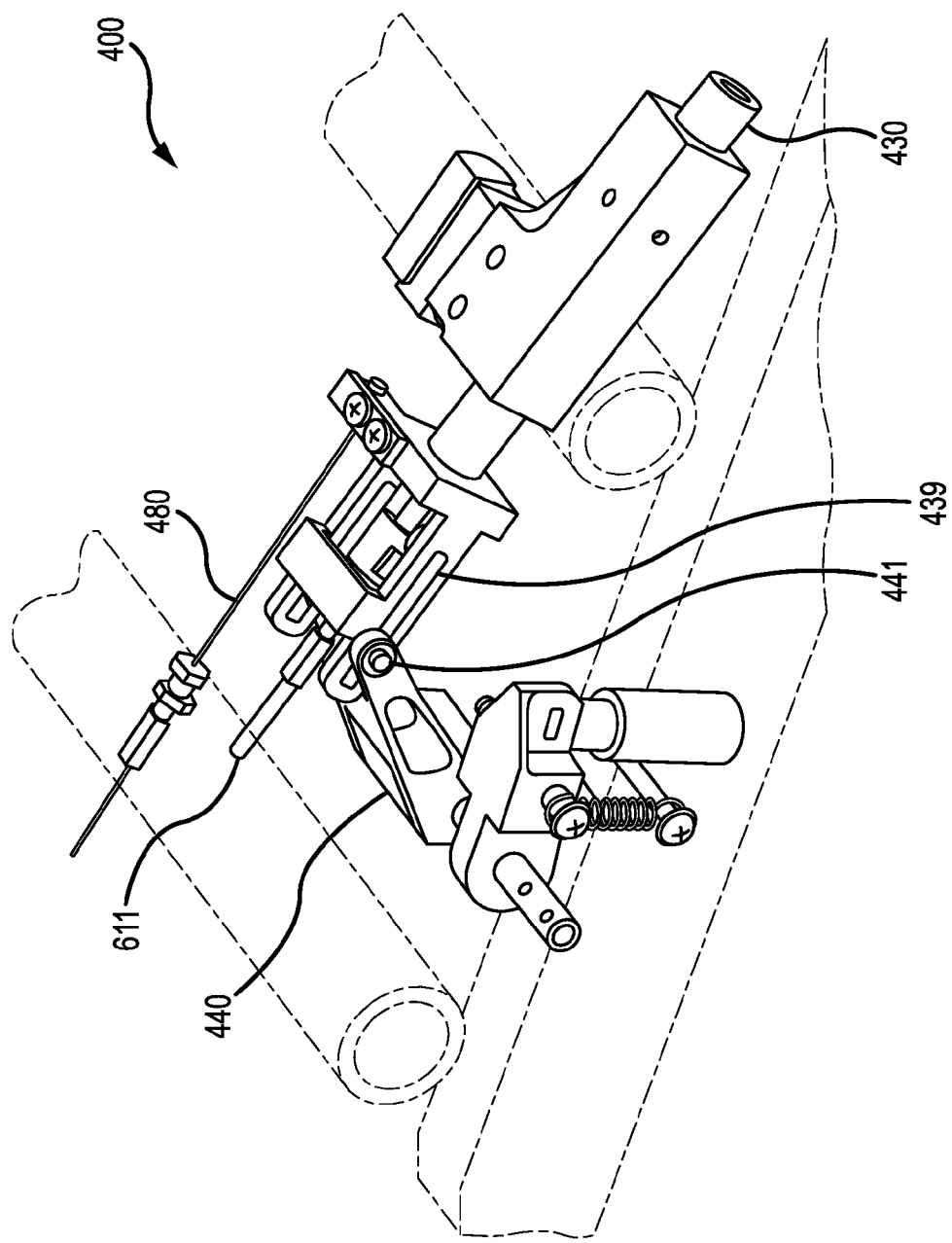

DUAL-FUNCTION SEAT ACTUATOR

FIELD

The present disclosure relates generally to aircraft seats. More particularly, the present disclosure relates to actuators for adjustable aircraft seats.

BACKGROUND

Many aircraft have powered seats. Powered aircraft seats utilize multiple actuation devices to move or release mechanisms within the structure of the seat. The mechanisms may allow for adjustment of the seat, such as adjusting a floor tracking feature or reclining a backrest. Some seats use linear or rotary electric actuators, which may be advantageous due to the flexibility in mounting, force output, and the ability to control the output position and speed. However, actuators may add significant weight and cost to a seat, particularly in seats which utilize multiple actuators.

SUMMARY

A dual-function linear actuator system may comprise a linear actuator, a primary link, a secondary link, a floor tracking linkage, a lifter, a locking pin, and a spring. The primary link may be coupled to the linear actuator. The secondary link may be coupled to the primary link. The secondary link may comprise a lost motion gap. The floor tracking linkage may comprise a pin located within the lost motion gap. The lifter may be coupled to the floor tracking linkage. The locking pin may be coupled to the lifter. The spring may be coupled to the lifter.

An aircraft seat may comprise a dual-function linear actuator. The dual-function linear actuator may be configured to actuate a first adjustment mechanism in response to translating in a first direction. The dual-function linear actuator may be configured to actuate a second adjustment mechanism in response to translating in a second direction.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

FIG. 6A illustrates a perspective view of the actuator system in the forward position according to various embodiments;

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Systems and methods are disclosed herein for an aircraft seat with a dual-function linear actuator. The actuator may be an electric actuator. The actuator may have a neutral position. A first adjustment feature may be controlled by driving the actuator in a first direction. A second adjustment feature may be controlled by driving the actuator in a second direction.

Figure 1A:
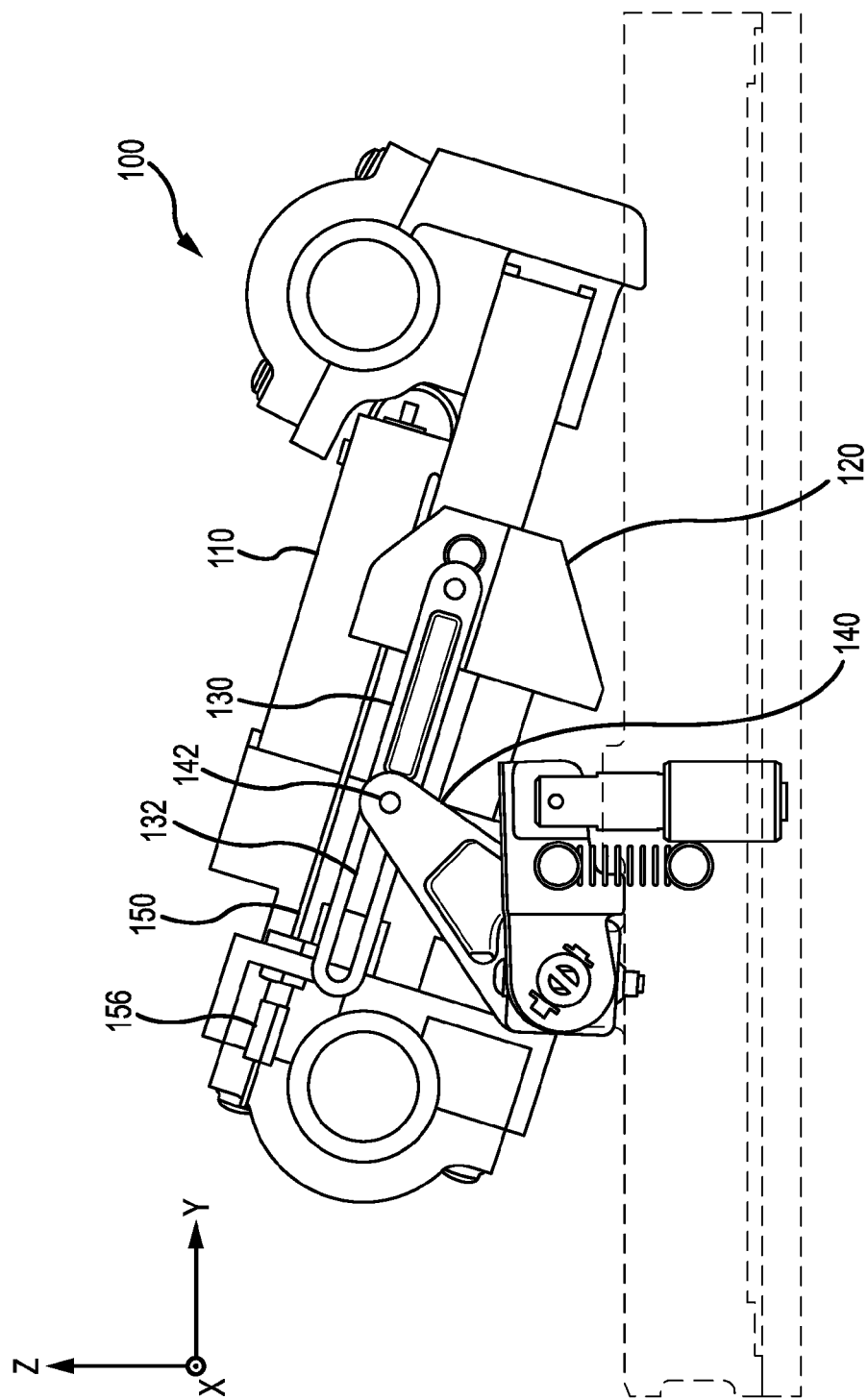
FIG. 1A illustrates a side view of a dual-function linear actuator system in a neutral position according to various embodiments.
Figure 1B:
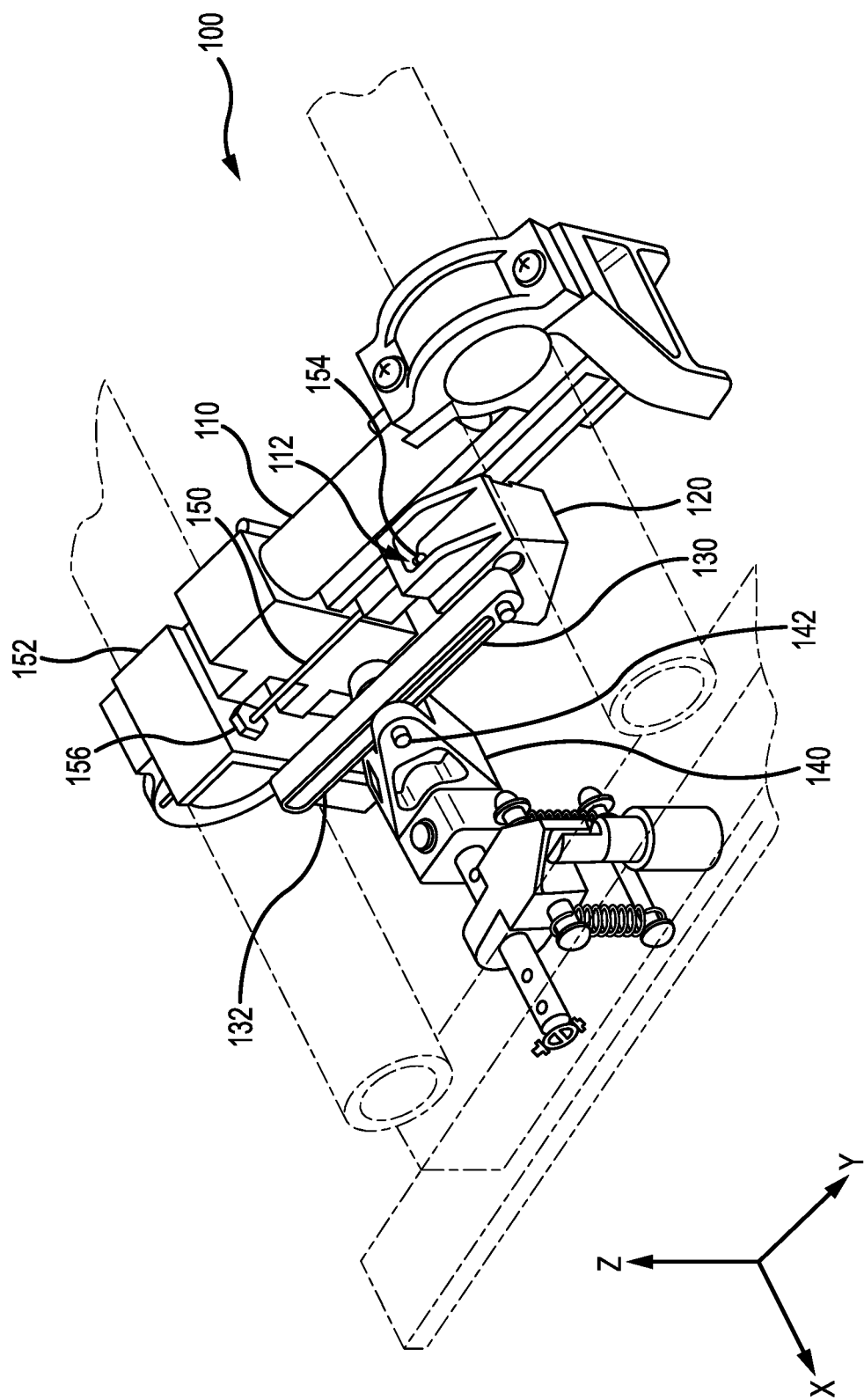
FIG. 1B illustrates a perspective view of a dual-function linear actuator system in a neutral position according to various embodiments.

Referring to FIGS. 1A and 1B, a dual-function linear actuator system 100 for an aircraft seat is illustrated in a neutral (locked) position according to various embodiments. X-y-z axes are shown for ease of illustration. As used herein, the term forward represents the positive y-direction, the term rear or aft represents the negative y-direction, the term down represents the negative z-direction, and the term up represents the positive z-direction. The actuator system 100 may comprise a linear actuator 110. The linear actuator 110 may drive a primary link 120 in a forward or aft direction (positive or negative y-direction). The linear actuator 110 may be electronically activated by a person sitting in the seat pressing a switch. A secondary link 130 may be coupled to the primary link 120. The secondary link 130 may be an elongate component having a lost motion gap, such as an elongate slot 132 therein. The secondary link 130 may be pivotably coupled to the primary link 120.

The actuator system 100 may comprise a first adjustment feature. In various embodiments, the first adjustment feature may be a floor tracking linkage 140. The floor tracking linkage 140 may allow the seat to be adjusted forwards or backwards relative to the floor. The floor tracking linkage 140 may comprise a pin 142 extending through the elongate slot 132. The elongate slot 132 may allow the secondary link 130 to translate from the neutral position shown in FIGS. 1A and 1B to the forward position shown in FIG. 2 without applying a load on the floor tracking linkage 140. The pin 142 may slide within the elongate slot 132, allowing the primary link 120 and the secondary link 130 to translate relative to the floor tracking linkage 140.

The actuator system 100 may comprise a second adjustment feature. The second adjustment feature may comprise a cable 150. The second adjustment feature may be any adjustment feature which may be operated by the cable 150, such as a track and swivel feature. The cable 150 may extend through an aft bracket 152 and an aperture 112 in the primary link 120. The cable 150 may comprise a bead 154 or other feature having a diameter greater than a diameter of the aperture 112, such that the cable 150 is prevented from pulling through the aperture 112 in response to the primary link 120 moving in the forward direction. The cable 150 may extend through a fitting 156 in the aft bracket 152. The fitting 156 and/or the second adjustment feature may comprise a spring which biases the cable 150 in the aft direction.

Figure 2:
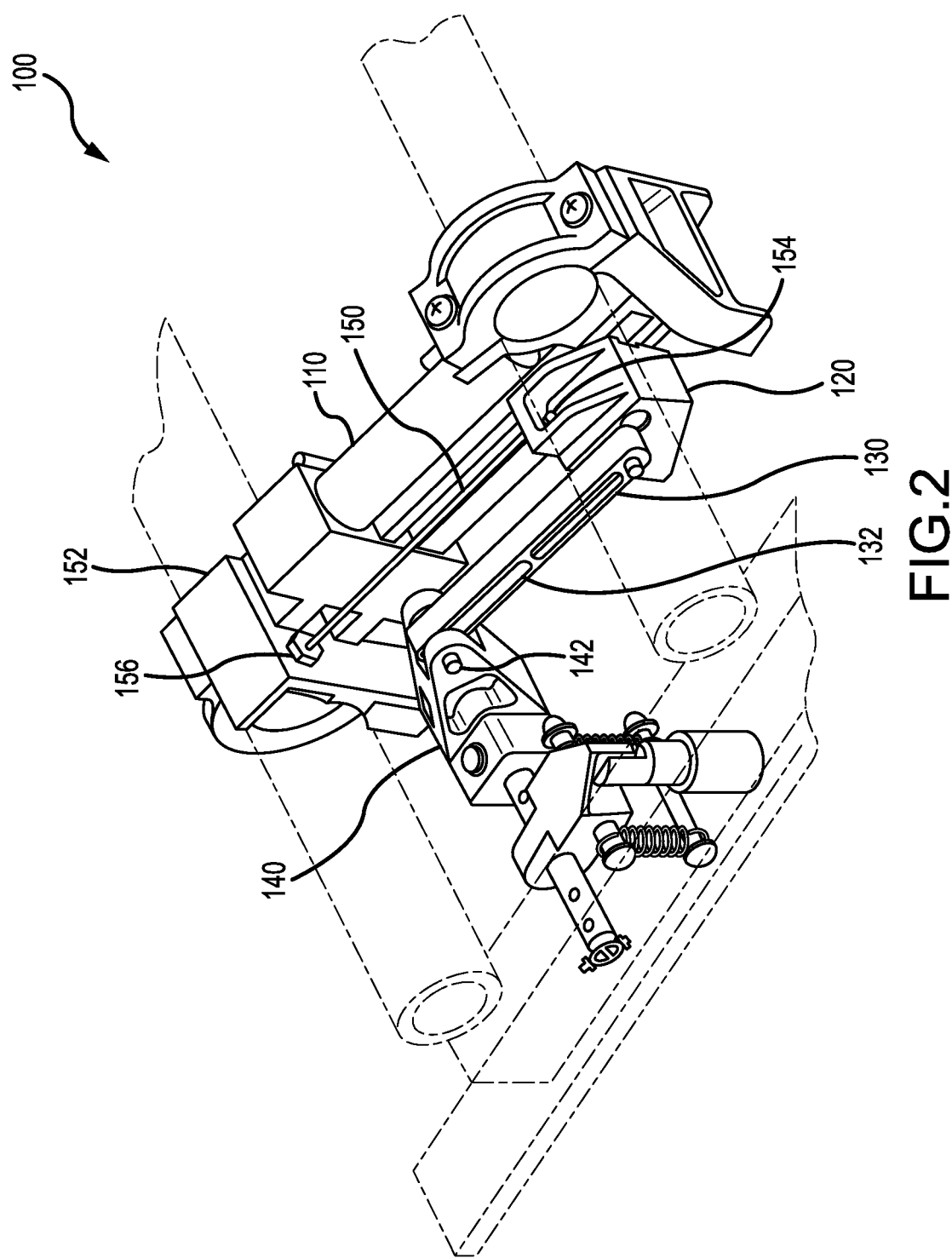
FIG. 2 illustrates a perspective view of the actuator system in the forward position according to various embodiments.

Referring to FIG. 2, a perspective view of the actuator system 100 in the forward position is illustrated according to various embodiments. A user may push a button to activate the second adjustment mechanism. The button may be located at any location accessible to the user, such as on an armrest for the seat. The linear actuator 110 may drive the primary link 120 in the forward direction, and the primary link 120 may in turn drive the secondary link 130 in the forward direction. The pin 142 may slide through the elongate slot 132. Thus, the secondary link 130 may not apply a force on the floor tracking linkage 140 in response to moving from the neutral position to the forward position. The primary link 120 may contact the bead 154 of the cable 150, pulling the cable 150 in the forward direction and through the fitting 156 in the aft bracket 152. The force on the cable 150 may activate the second adjustment mechanism, allowing the seat to be adjusted. The user may adjust the seat to the desired setting and then release the button. The linear actuator 110 may drive the primary link 120 back to the neutral position illustrated in FIGS. 1A and 1B. The primary link 120 may not apply a force on the cable 150 in the rear direction. However, the spring bias on the cable 150 may cause the cable 150 to translate in the rear direction with the primary link 120.

Figure 3A:
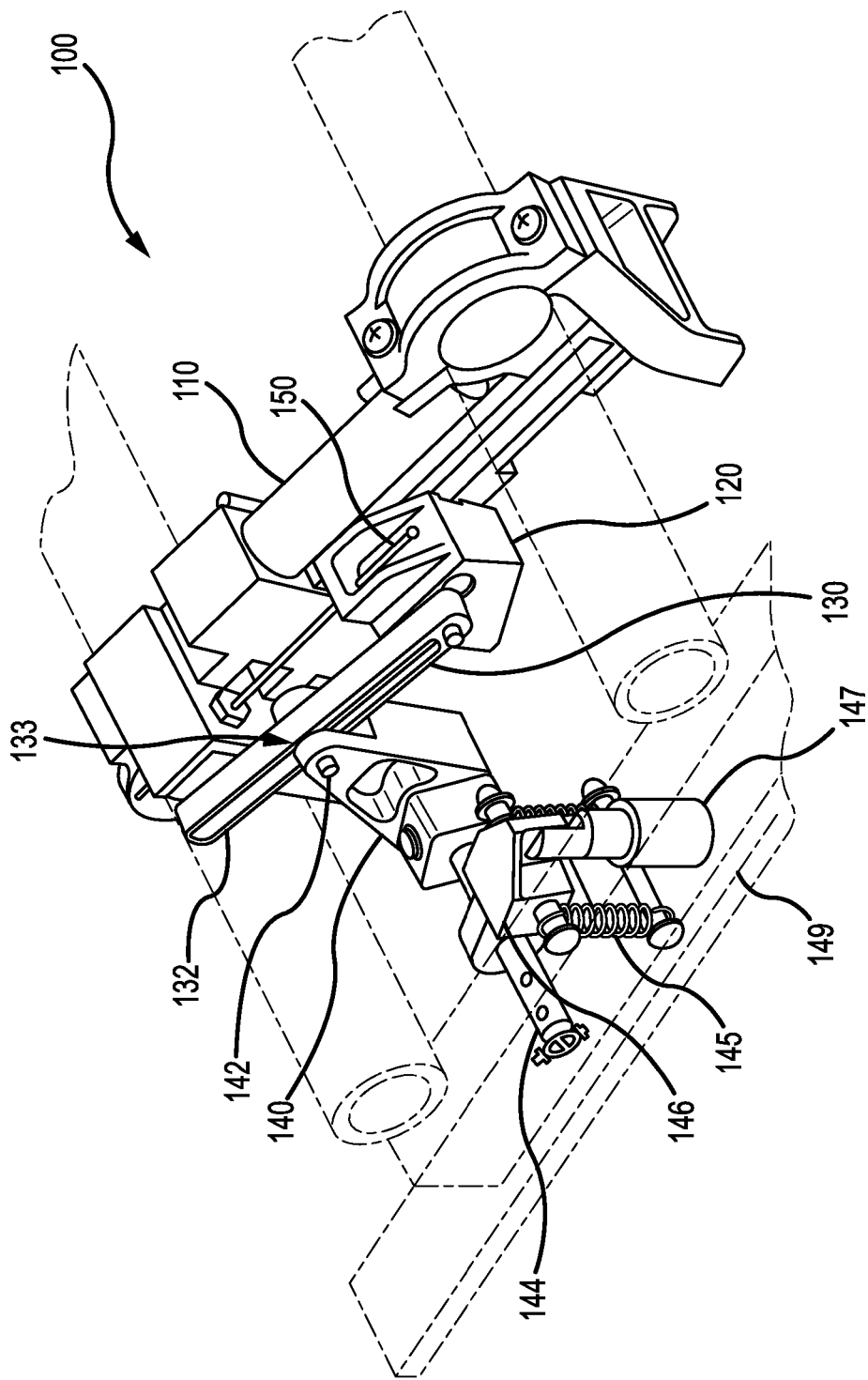
FIG. 3A illustrates a perspective view of the actuator system in the rear position according to various embodiments.
Figure 3B:
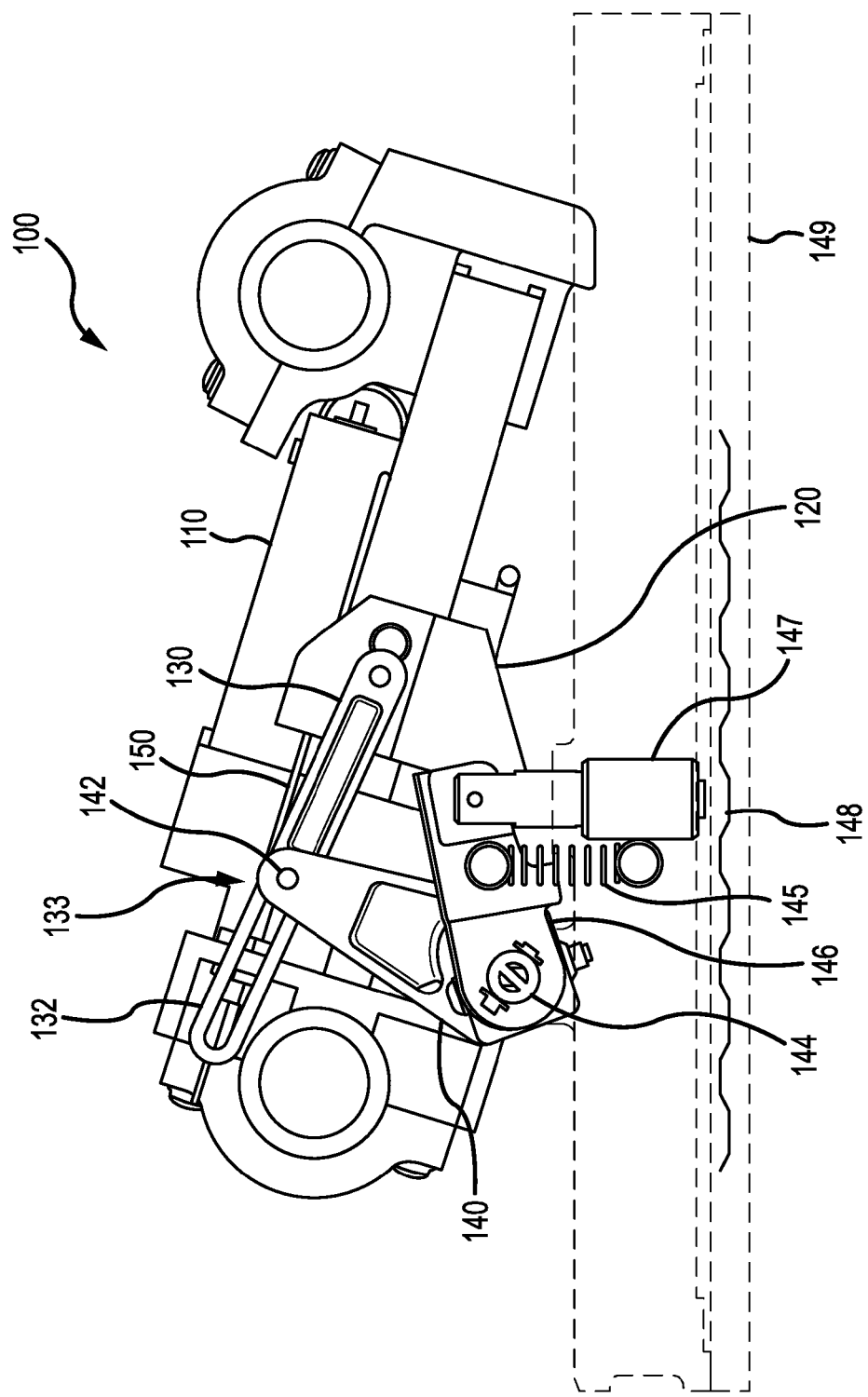
FIG. 3B illustrates a side view of the actuator system in the rear position according to various embodiments.

Referring to FIG. 3A and FIG. 3B, a perspective view and a side view of the actuator system 100 in the rear position is illustrated according to various embodiments. A user may push a button to activate the first adjustment feature. The linear actuator 110 may drive the primary link 120 in the rear direction, and the primary link 120 may in turn drive the secondary link 130 in the rear direction. The cable 150 may slide through the primary link 120. Thus, the movement of the primary link 120 from the neutral position shown in FIGS. 1A and 1B to the rear position shown in FIGS. 3A and 3B may not exert a force on the cable 150 or actuate the second adjustment feature.

A forward end 133 of the elongate slot 132 may contact the pin 142 and cause the floor tracking linkage 140 to rotate in a counter-clockwise direction about a torque tube 144. The torque tube 144 may rotate, causing a lifter 146 coupled to the torque tube 144 to rotate. The lifter 146 may be pivotably coupled to a locking pin 147. In response to the lifter 146 rotating in a counter-clockwise direction along with the torque tube 144 and the floor tracking linkage 140, the lifter 146 may pull the locking pin 147 up and out a locking slot 148. The seat may then be slid along a track 149 to a different locking slot. The lifter 146 may be coupled to a spring 145. The spring 145 may apply a downward force on the lifter 146. Thus, in response to the linear actuator 110 driving the primary link 120 and secondary link 130 back to the neutral position, the spring 145 may cause the lifter 146 to force the locking pin 147 down into a locking slot and the seat may be locked in place.

Power to the seat may be interrupted. In the event that the linear actuator 110 is in the forward or rear position, the seat may be in an unlocked state. The unlocked state may be unsafe for takeoff or landing or during turbulence. It may be desirable for the linear actuator 110 to be capable of being manually returned to the neutral position in order to lock the seat. In various embodiments, the linear actuator 110 may be back driven, in which case pushing on the seat or a portion of the actuator system 100 may force the linear actuator 110 back to the neutral position such that the first adjustment mechanism and the second adjustment mechanism lock the seat in place. However, in various embodiments, the linear actuator 110 may be decoupled from the first adjustment feature and/or the second adjustment feature, such that the adjustment features may be locked without back driving the linear actuator 110.

Figure 4:
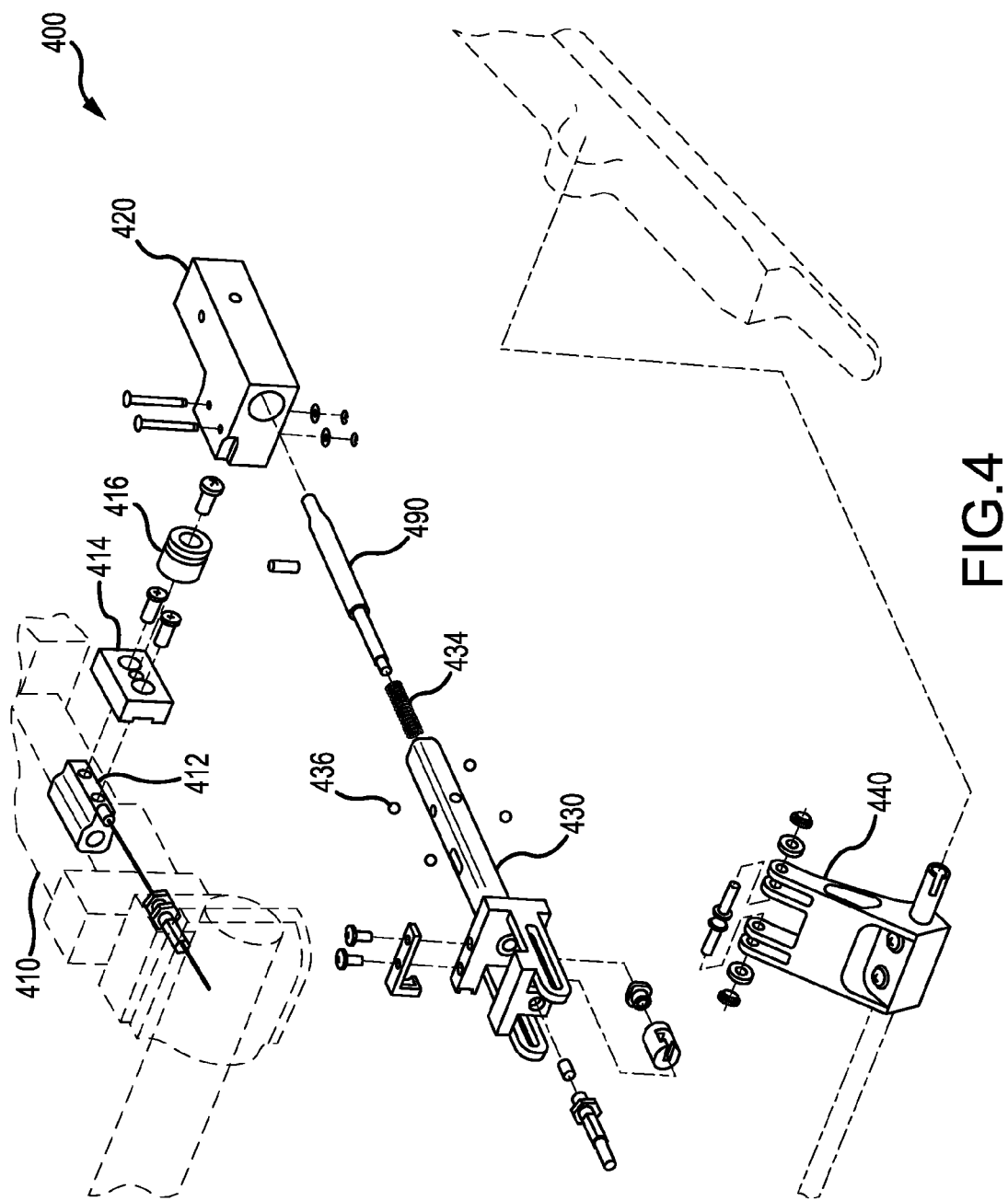
FIG. 4 illustrates an exploded view of a linear actuator system having a decoupling mechanism according to various embodiments.

Referring to FIG. 4, an exploded view of a linear actuator system 400 having a decoupling mechanism is illustrated according to various embodiments. The decoupling mechanism may allow the actuator system 400 to be manually adjusted without back driving the linear actuator 410. The linear actuator 410 is a dual-function actuator for a first adjustment feature and a second adjustment feature. However, those skilled in the art will appreciate that the decoupling principles described herein are compatible with single-function actuators as well.

The actuator system 400 may comprise a linear actuator 410, an actuator trolley 412, a trolley adapter 414, a pivot post 416, a first link 420, a second link 430, a decoupling rod 490, a compression spring 434, a plurality of locking balls 436, and a third link 440.

Figure 5A:
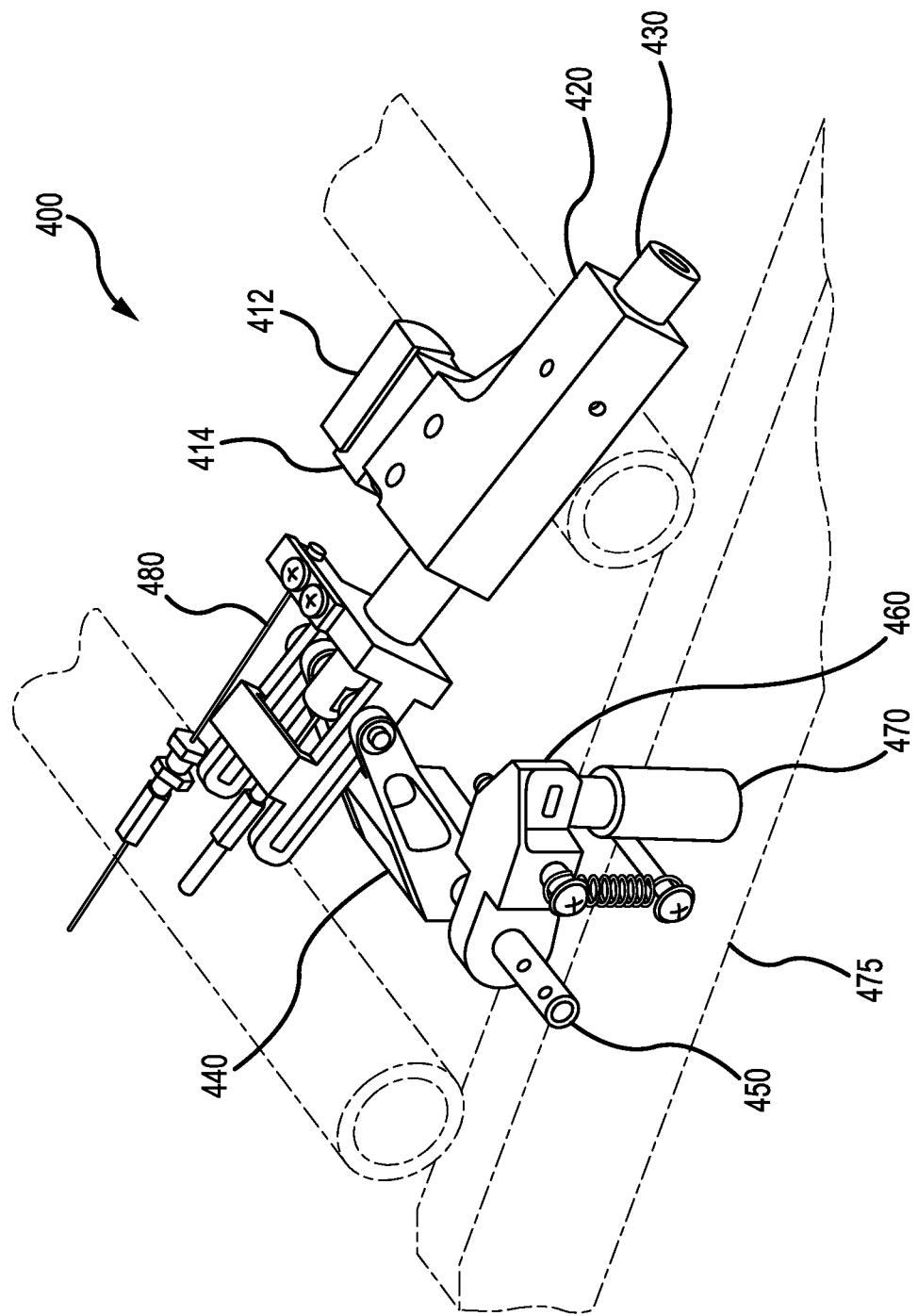
FIG. 5A illustrates a perspective view of the actuator system in the neutral position according to various embodiments.
Figure 5B:
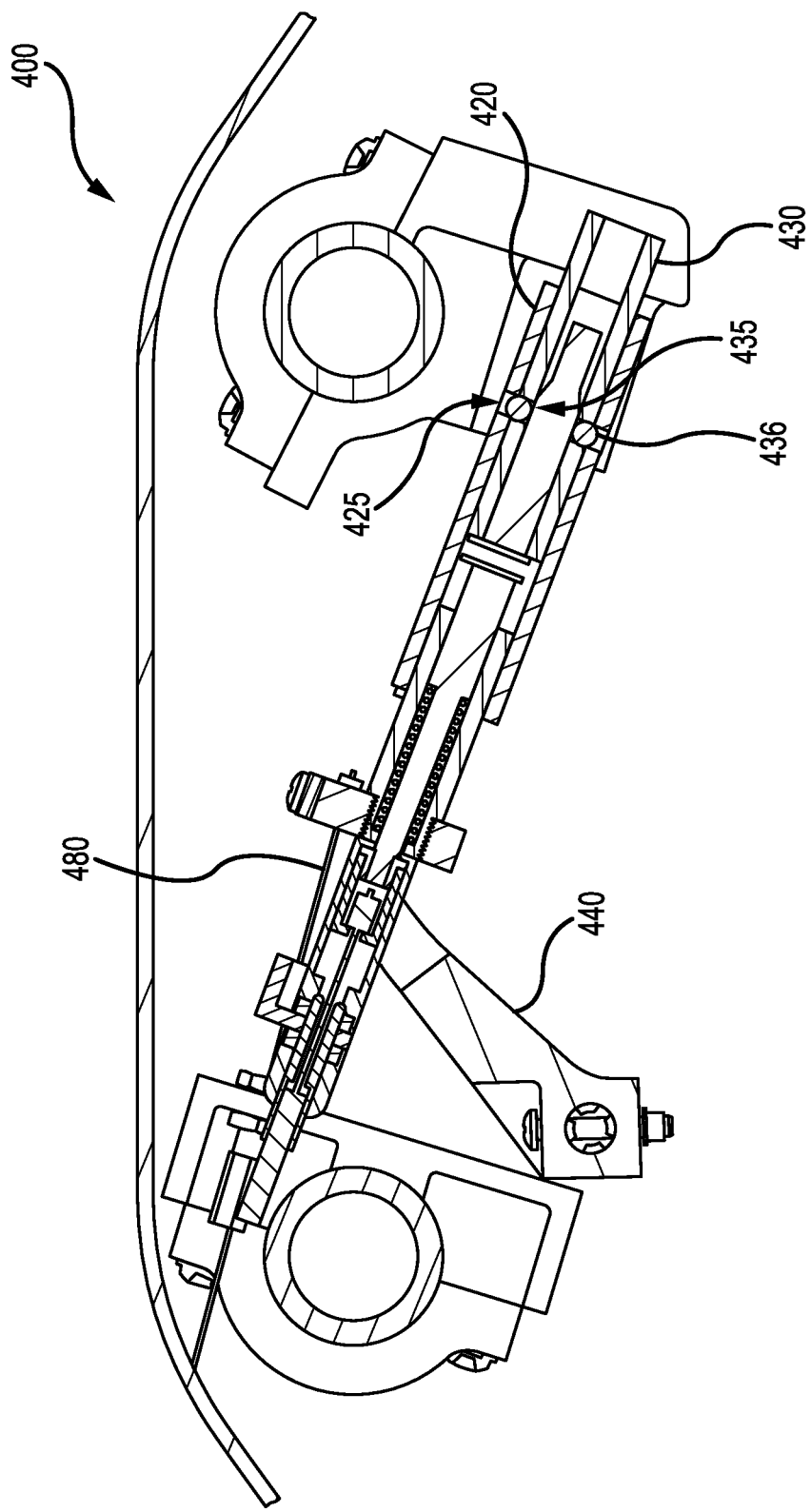
FIG. 5B illustrates a cross-section view of the actuator system in the neutral position according to various embodiments.

Referring to FIG. 5A and FIG. 5B, a perspective view and a cross-section view of the linear actuator system 400 in a neutral (locked) position are illustrated according to various embodiments. The first link 420 may be coupled to the actuator trolley 412 via the trolley adapter 414. The second link 430 may comprise a substantially cylindrical portion located at least partially within the first link 420. The second link 430 may be pivotably coupled to the third link 440. In various embodiments, the third link 440 may be a floor tracking link. The third link 440 may be coupled to a torque tube 450, which may be coupled to a lifter 460 and a locking pin 470. The locking pin 470 may lock into a track 475 which may lock a seat in place. In order to unlock the locking pin 470 and move the seat, the linear actuator 410 may be driven rearward, which may cause the actuator trolley 412, trolley adapter 414, first link 420, and second link 430 to be driven rearward, causing the third link 440, torque tube 450, and lifter 460 to rotate and move the locking pin 470 upward as similarly described with reference to FIGS. 1-4. Additionally, the actuator system 400 may comprise a cable 480 for a second adjustment feature as similarly described with reference to FIGS. 1-4.

The first link 420 may be prevented from translating relative to the second link 430 by the plurality of locking balls 436. The locking balls 436 may be located at least partially within apertures 425 in the first link 420 and apertures 435 in the second link 430. Thus, in response to the trolley adapter 414 applying a force in the rearward direction on the first link 420, the first link 420 may apply a force in the rearward direction on the second link 430 via the locking balls 436.

Figure 6B:
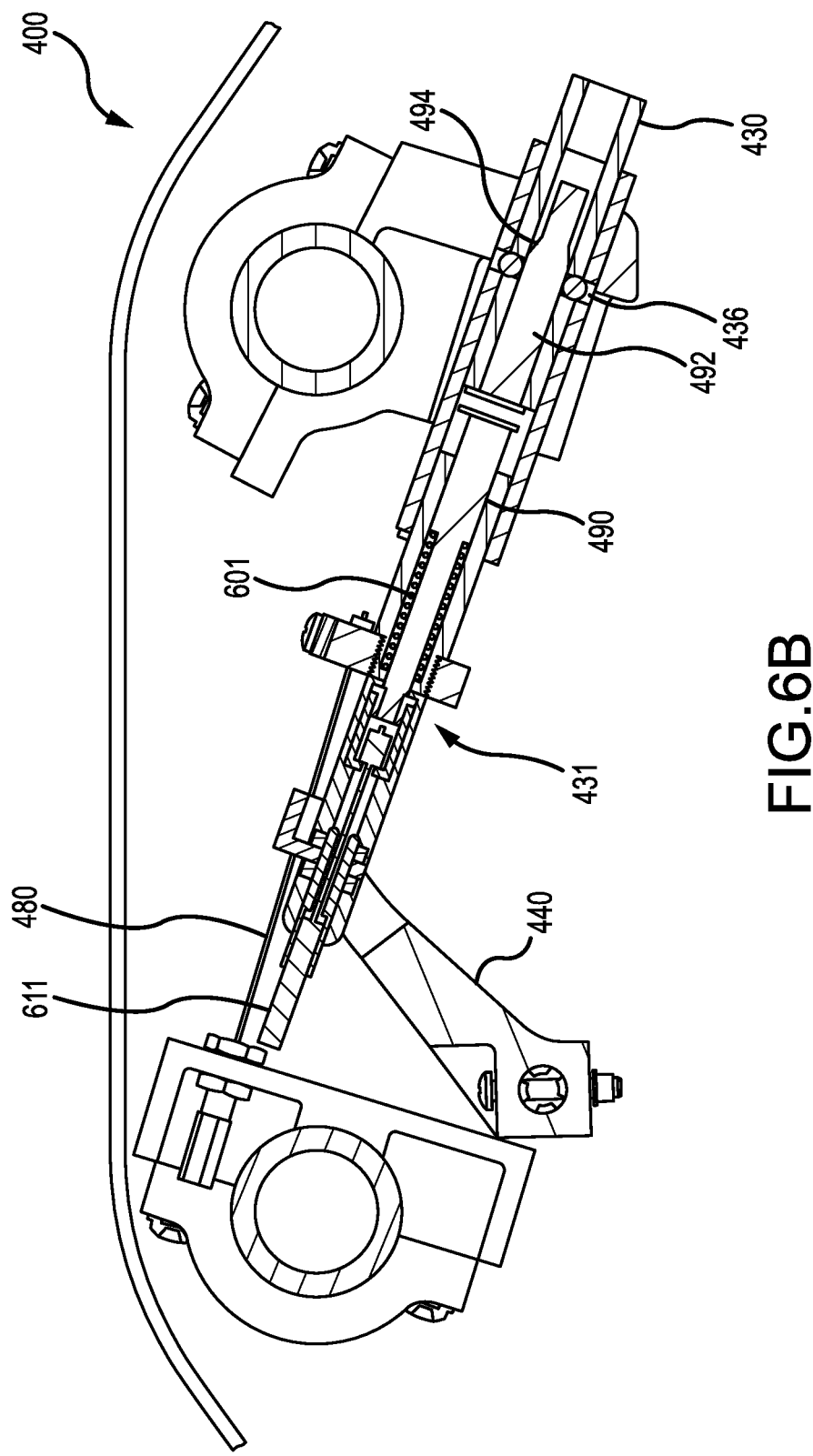
FIG. 6B illustrates a cross-section view of the actuator system in the forward position according to various embodiments.

Referring to FIG. 6A and FIG. 6B, a perspective view and a cross-section view of the actuator system 400 in the forward position with the second adjustment feature unlocked via the cable 480 is illustrated according to various embodiments. The third link 440 may comprise a pin 441 which slides within an elongate slot 439 in the second link 430. The decoupling rod 490 may comprise a cylindrical body 492 with a tapered shoulder 494. A compression spring 601 may apply a force between a first end 431 of the second link 430 and the cylindrical body 492. The locking balls 436 may be in contact with the cylindrical body 492. A decoupling cable 611 may be coupled to the decoupling rod 490. In the event of a power failure, the decoupling cable 611 may be pulled and the first adjustment feature and the second adjustment feature may be locked/unlocked and/or adjusted without electrical power.

Figure 7:
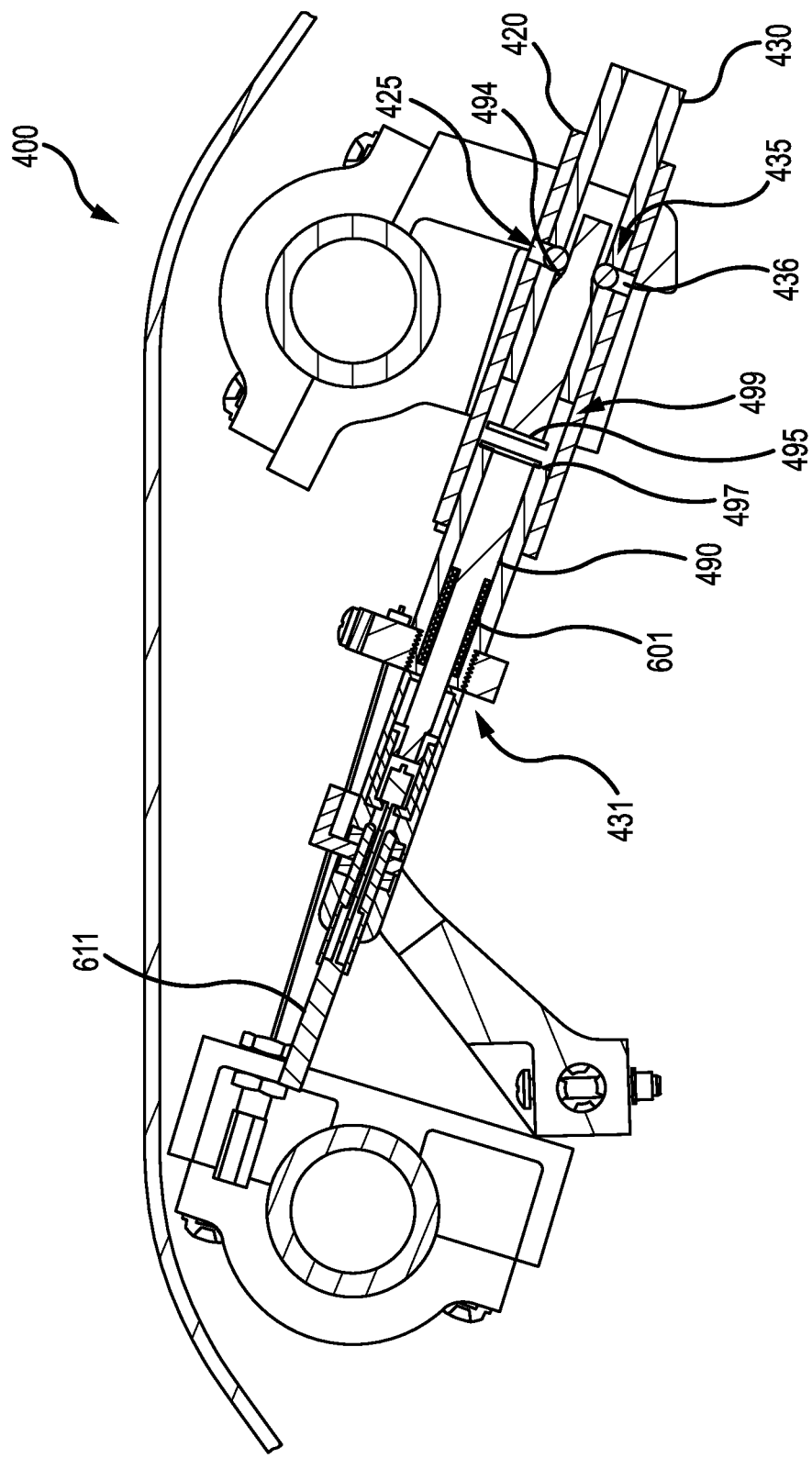
FIG. 7 illustrates a cross-section view of the actuator system in the forward position with the decoupling cable pulled according to various embodiments.

Referring to FIG. 7, a cross-section view of the actuator system 400 in the forward position with the decoupling cable 611 pulled is illustrated according to various embodiments. In response to the decoupling cable 611 being pulled, the decoupling rod 490 may translate in the rearward direction within the second link 430. The decoupling rod 490 may compress the compression spring 601 against the first end 431 of the second link 430. The decoupling rod 490 may translate rearward until the anti-rotation pin 495 contacts the rear end 497 of the anti-rotation slot 499. The tapered shoulder 494 of the decoupling rod 490 may translate across the apertures 435 in the second link 430, allowing the locking balls 436 to move toward a center of the second link 430 and out of the apertures 425 in the first link 420. In response to the locking balls 436 moving out of the apertures 425, the second link 430 may be decoupled from the first link 420, allowing the second link 430 to translate within the first link 420.

Figure 8:
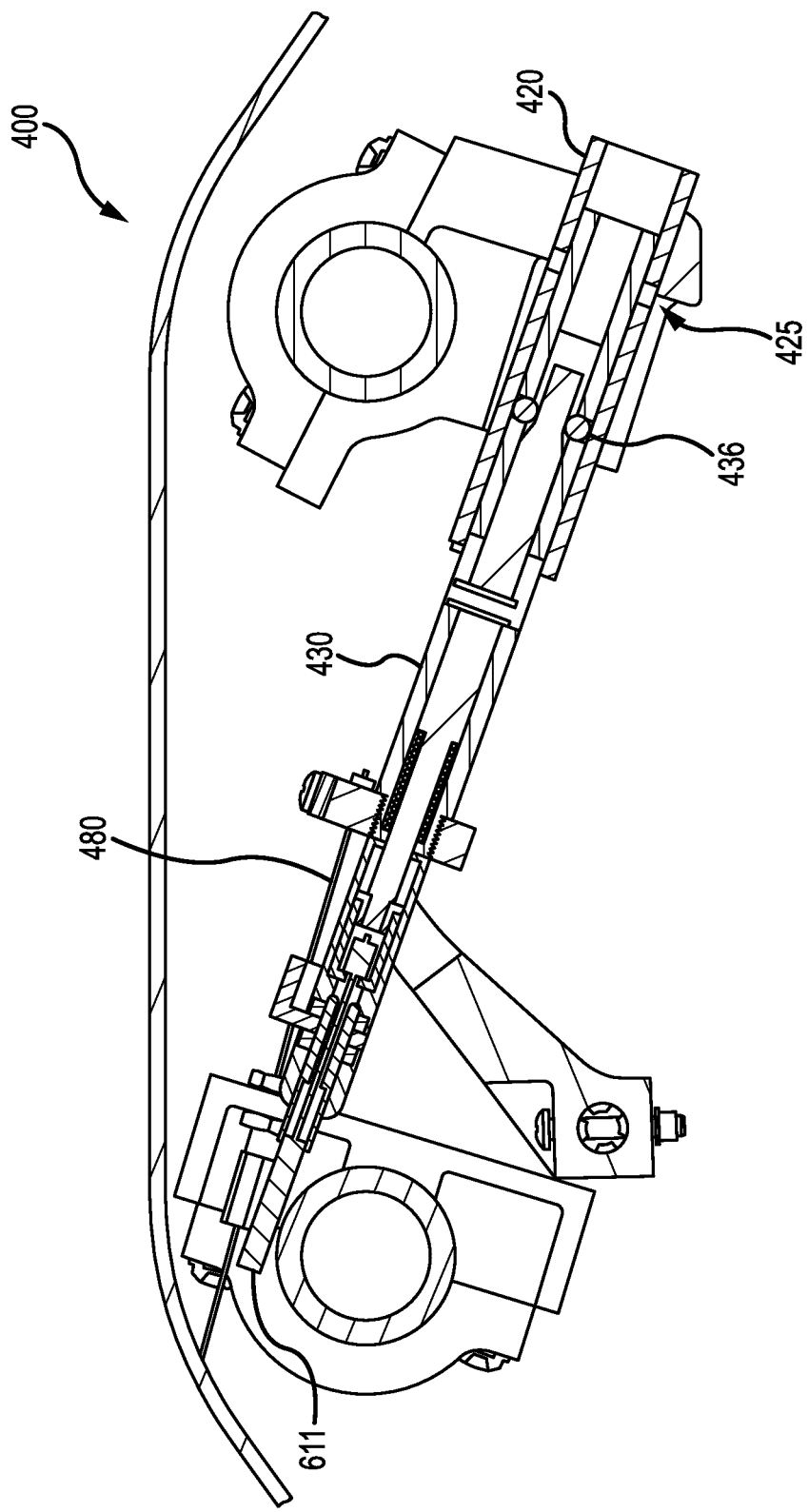
FIG. 8 illustrates a cross-section view of the actuator system with the second link decoupled from the first link according to various embodiments.

Referring to FIG. 8, a cross-section view of the actuator system 400 with the second link 430 decoupled from the first link 420 is illustrated according to various embodiments. The tension from the decoupling cable 611 causes the second link 430 to translate rearward within the first link 420. This may release the tension on the cable 480 for the second adjustment feature. Thus, the second adjustment feature may be locked even though the actuator system 400 may remain in the forward position. In response to restoring power to the actuator system 400, the actuator system 400 may be programmed to return to the neutral position. The actuator system 400 may return to the neutral position, causing the first link 420 to translate relative to the second link 430, and the locking balls 436 may re-enter the apertures 425 in the first link 420, coupling the first link 420 and the second link 430 together.

Figure 9:
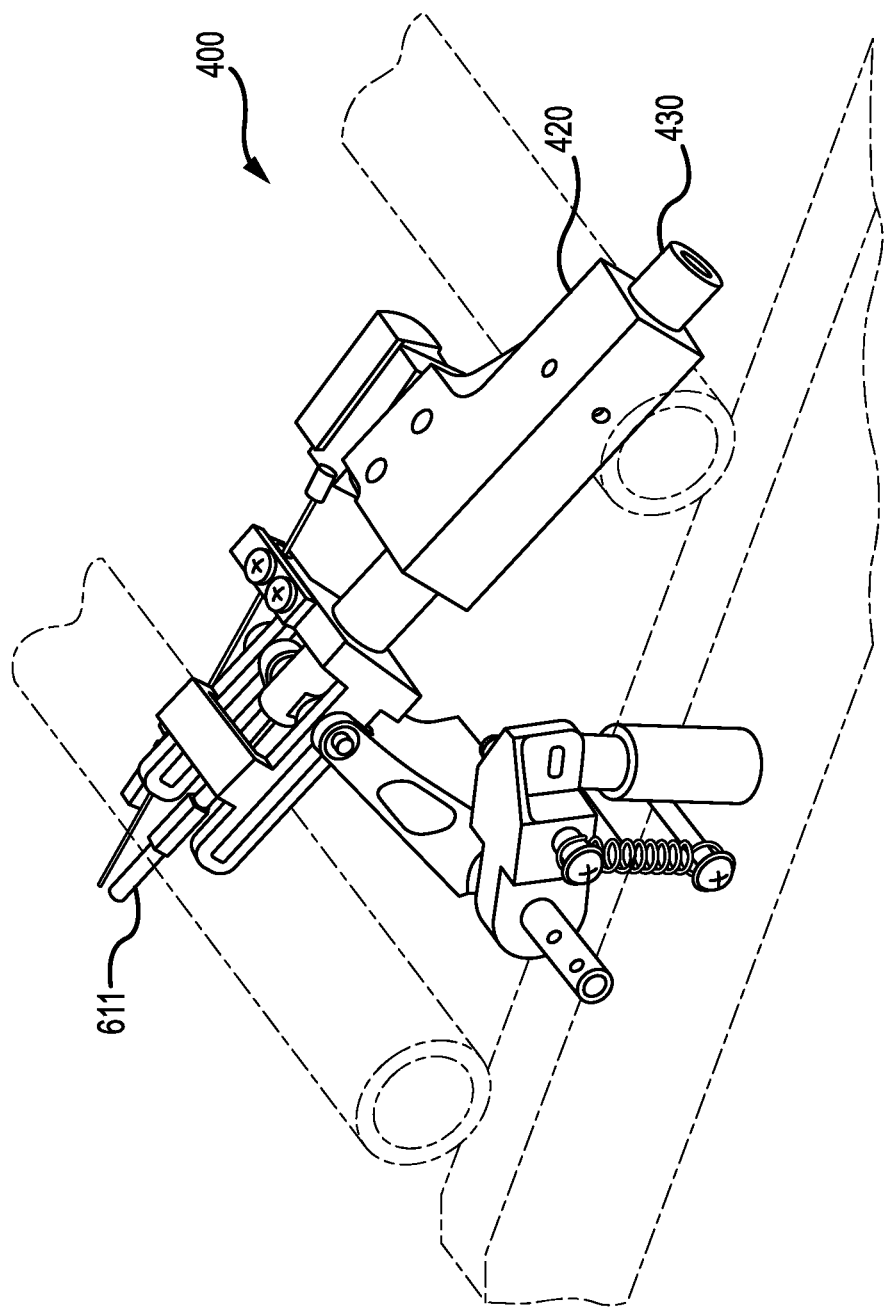
FIG. 9 illustrates a perspective view of the actuator system in the rear position according to various embodiments.

Referring to FIG. 9, a perspective view of the actuator system 400 in the rear position is illustrated according to various embodiments. In the rear position, the first adjustment mechanism may be unlocked. In the event of a loss of power, the decoupling cable 611 may be pulled in order to decouple the first link 420 from the second link 430.

Figure 10:
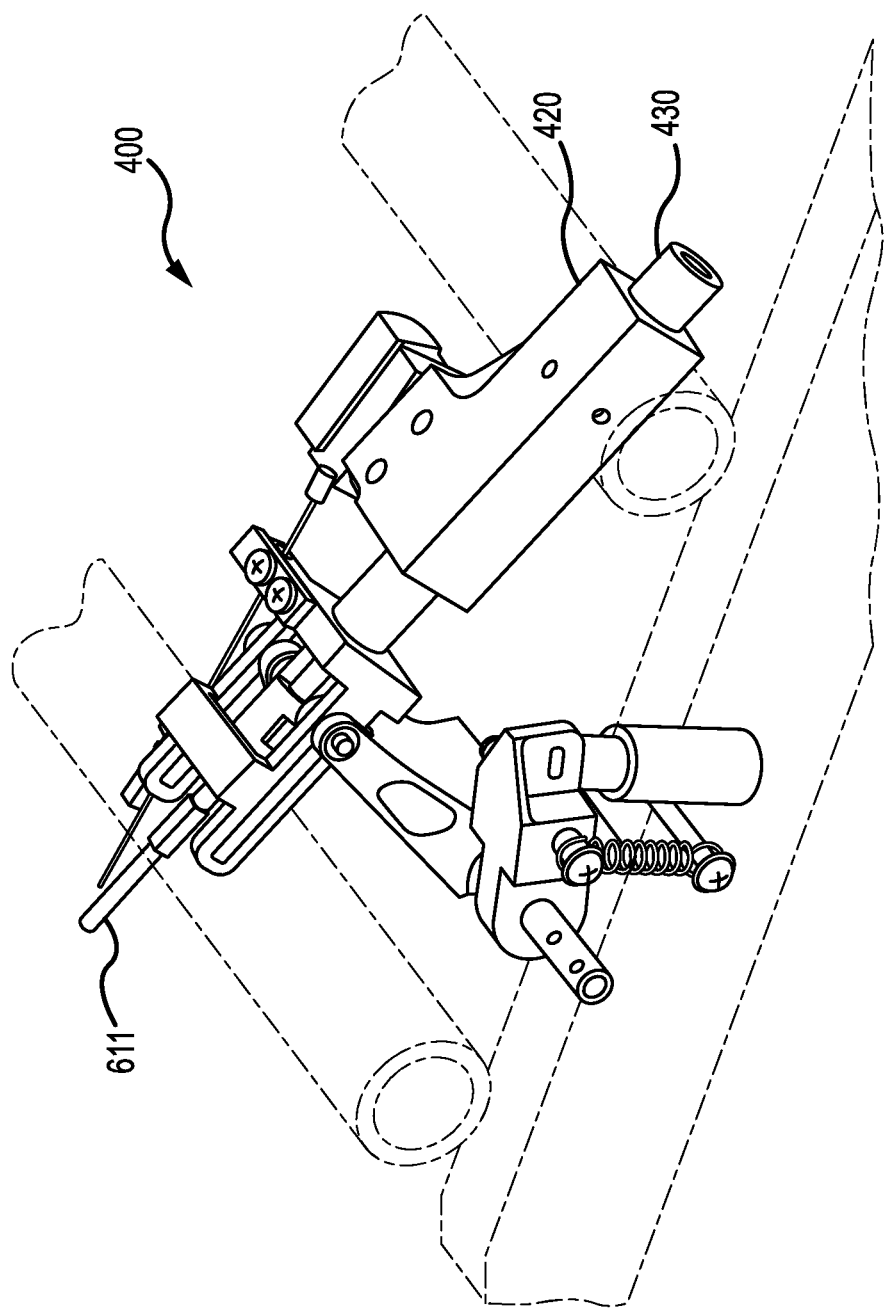
FIG. 10 illustrates a perspective view of the actuator system in the rear position with the decoupling mechanism activated according to various embodiments.

Referring to FIG. 10, a perspective view of the actuator system 400 in the rear position with the decoupling mechanism activated is illustrated according to various embodiments. The decoupling cable 611 has been pulled in the aft direction, decoupling the second link 430 from the first link 420, as previously described with reference to FIG. 7.

Figure 11:
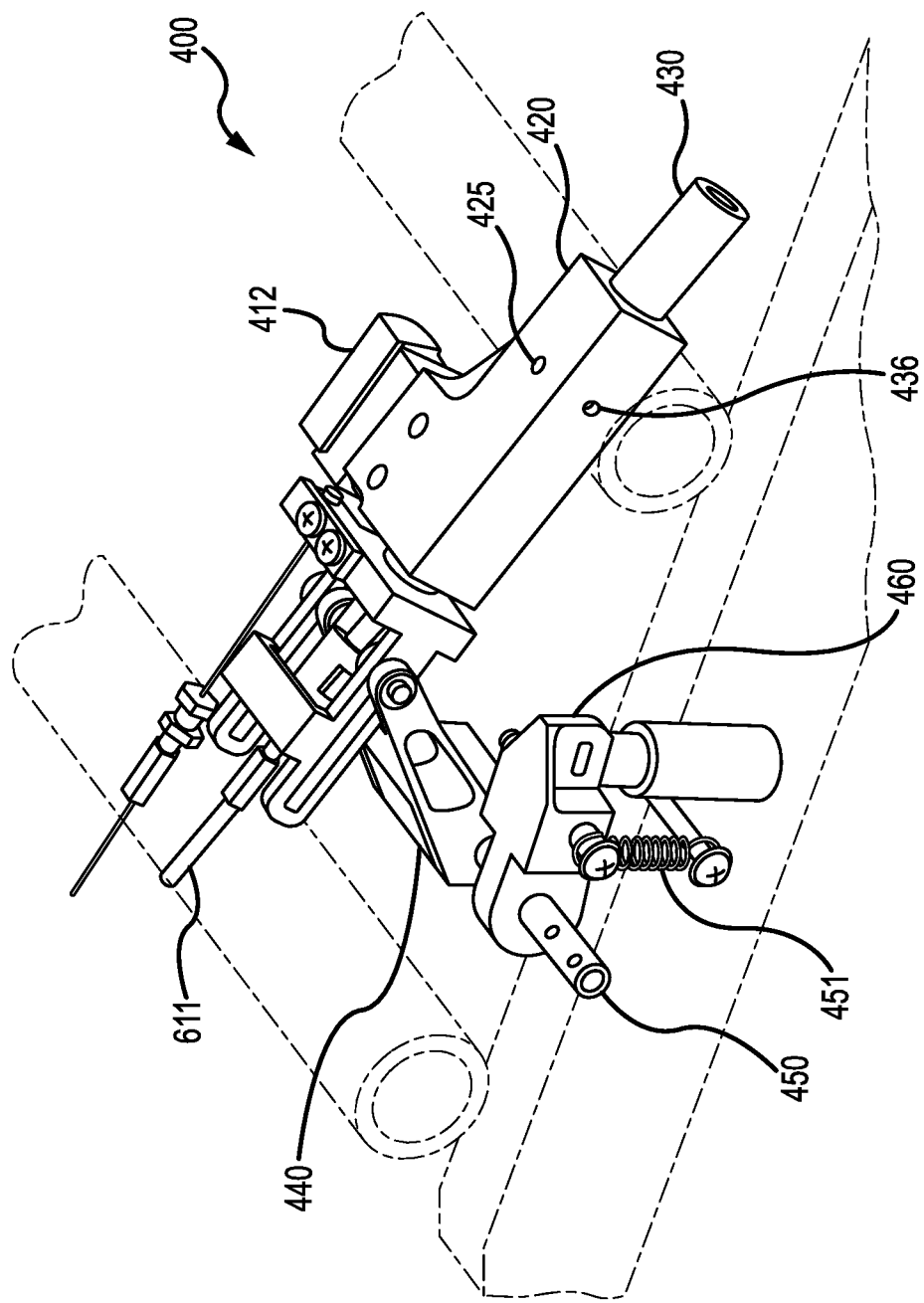
FIG. 11 illustrates a perspective view of the actuator system in the rear position with the second link decoupled from the first link according to various embodiments.

Referring to FIG. 11, a perspective view of the actuator system 400 in the rear position with the second link 430 decoupled from the first link 420 is illustrated according to various embodiments. In response to the second link 430 being decoupled from the first link 420, the spring 451 may drive the lifter 460 downward, causing the torque tube 450 to rotate in a clockwise direction, in turn causing the third link 440 to drive the second link 430 forward through the first link 420. Thus, the first adjustment feature may be locked while the actuator trolley 412 is in the rear position by applying tension to the decoupling cable 611. In response to restoring power to the actuator system 400, the actuator trolley 412 may be programmed to return to the neutral position. The actuator trolley 412 may return to the neutral position, causing the first link 420 to translate relative to the second link 430, and the locking balls 436 may re-enter the apertures 425 in the first link 420, coupling the first link 420 and the second link 430 together.

In various embodiments, one or more levers may be manually operated in order to adjust the first adjustment feature or the second adjustment feature while the first link 420 is decoupled from the second link 430. Thus, regardless of the position of the actuator trolley 412 at the time of power failure, the adjustment features may be manually operated.

Although described primarily with reference to aircraft seats, the present disclosure may be utilized in any setting in which it may be desirable to have a multi-functional linear actuator, or a manual override for a powered linear actuator.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A dual-function linear actuator system comprising:
a linear actuator;
a primary link coupled to the linear actuator;
a secondary link coupled to the primary link, wherein the secondary link comprises a lost motion gap;
a floor tracking linkage comprising a pin located within the lost motion gap;
a lifter coupled to the floor tracking linkage;
a locking pin coupled to the lifter;
a spring coupled to the lifter; and
a cable extending through the primary link and an aft bracket.

2. The dual-function linear actuator system of claim 1, further comprising a locking ball located at least partially within an aperture in the primary link and at least partially within an aperture in the secondary link.

3. The dual-function linear actuator system of claim 1, wherein the floor tracking linkage is coupled to the lifter via a torque tube.

4. The dual-function linear actuator system of claim 1, wherein the locking pin is configured to unlock in response to the linear actuator moving to a rear position.

5. The dual-function linear actuator system of claim 1, wherein the cable is configured to release an adjustment feature in response to the linear actuator moving to a forward position.

6. The dual-function linear actuator system of claim 1, further comprising a decoupling rod located within the secondary link.

7. The dual-function linear actuator system of claim 6, wherein the decoupling rod comprises a tapered shoulder.

8. The dual-function linear actuator system of claim 6, further comprising a decoupling cable coupled to the decoupling rod.

9. A dual-function linear actuator system comprising:
a linear actuator;
a primary link coupled to the linear actuator;
a secondary link coupled to the primary link, wherein the secondary link comprises a lost motion gap;
a floor tracking linkage comprising a pin located within the lost motion gap;
a lifter coupled to the floor tracking linkage via a torque tube;
a locking pin coupled to the lifter; and
a spring coupled to the lifter.

10. A dual-function linear actuator system comprising:
a linear actuator;
a primary link coupled to the linear actuator;
a secondary link coupled to the primary link, wherein the secondary link comprises a lost motion gap;
a floor tracking linkage comprising a pin located within the lost motion gap;
a lifter coupled to the floor tracking linkage;
a locking pin coupled to the lifter, wherein the locking pin is configured to unlock in response to the linear actuator moving to a rear position; and
a spring coupled to the lifter.

11. A dual-function linear actuator system comprising:
a linear actuator;
a primary link coupled to the linear actuator;
a secondary link coupled to the primary link, wherein the secondary link comprises a lost motion gap;
a decoupling rod located within the secondary link;
a floor tracking linkage comprising a pin located within the lost motion gap;
a lifter coupled to the floor tracking linkage;
a locking pin coupled to the lifter; and
a spring coupled to the lifter.

12. The dual-function linear actuator system of claim 11, wherein the decoupling rod comprises a tapered shoulder.

13. The dual-function linear actuator system of claim 11, further comprising a decoupling cable coupled to the decoupling rod.

14. A dual-function linear actuator system comprising:
a linear actuator;
a primary link coupled to the linear actuator;
a secondary link coupled to the primary link, wherein the secondary link comprises a lost motion gap;
a locking ball located at least partially within an aperture in the primary link and at least partially within an aperture in the secondary link;
a floor tracking linkage comprising a pin located within the lost motion gap;
a lifter coupled to the floor tracking linkage;
a locking pin coupled to the lifter; and
a spring coupled to the lifter.

* * * * *